(12) United States Patent
Mason et al.

(10) Patent No.: US 8,356,941 B2
(45) Date of Patent: Jan. 22, 2013

(54) RAILWAY CAR BEARING SEAL

(75) Inventors: Michael Mason, Richmond, VA (US);
Paul A. Hubbard, Petersburg, VA (US);
Mark Fetty, Chesterfield, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 544 days.

(21) Appl. No.: 12/660,916

(22) Filed: Mar. 8, 2010

(65) Prior Publication Data
US 2011/0216993 A1 Sep. 8, 2011

(51) Int. Cl.
*F16C 33/76* (2006.01)
(52) U.S. Cl. ........................ 384/477; 384/484
(58) Field of Classification Search .................. 384/459, 384/477, 478, 480, 482, 484, 486, 548, 571, 384/589; 277/411, 412, 418–420
See application file for complete search history.

(56) References Cited

U.S. PATENT DOCUMENTS

| | | | | |
|---|---|---|---|---|
| 5,028,054 A | * | 7/1991 | Peach | 277/348 |
| 5,290,047 A | * | 3/1994 | Duffee et al. | 277/419 |
| 6,845,986 B2 | * | 1/2005 | Hood et al. | 277/409 |
| 7,607,836 B2 | * | 10/2009 | Mason et al. | 384/480 |
| 2004/0080113 A1 | * | 4/2004 | Linden et al. | 277/412 |

* cited by examiner

*Primary Examiner* — Phillip A Johnson
(74) *Attorney, Agent, or Firm* — Edward J. Brosius

(57) ABSTRACT

A bearing assembly is provided having a roller bearing with an inner raceway fitted around the journal portion of an axle. An outer raceway combines with the inner raceway to receive roller elements. An improved lubricant seal arrangement is provided between the wear ring and the supporting outer raceway comprising a stator element, a rotor element and a flinger element.

18 Claims, 3 Drawing Sheets

RAILWAY CAR BEARING SEAL

BACKGROUND OF THE INVENTION

This invention relates to shaft journal bearings and, more particularly, to an improved bearing assembly seal arrangement for use in a railway freight car.

Roller bearing assemblies incorporating two rows of tapered roller bearings preassembled into a self-contained, pre-lubricated package for assembly onto journals at the ends of axles or shafts are known. Such bearing assemblies are used as rail car bearings assembled onto journals at the ends of the axles. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing and proper lateral clearance on the journal. Seals mounted within each end of the bearing cup provide sealing contact with wear rings bearing against the outer ends or back face of the respective bearing cones at each end of the assembly. Such seals are shown in U.S. Pat. Nos. 5,975,533, 7,607,836, and 7,534,047.

In a typical rail car installation, the axle journal is machined with a fillet at the inboard end. A backing ring having a surface complementary to the contour of the fillet and an abutment surface for engaging the inboard end of an inner wear ring accurately position the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide interference fit with the journal over at least a portion of their length so that the entire assembly is pressed as a unit onto the end of the journal shaft portion of the axle.

SUMMARY OF THE INVENTION

The bearing assembly of the present invention is a roller bearing that includes an inner race or cone fitted around the journal portion of the axle or shaft. The inner race includes an outwardly directed raceway. An outer race or cup has an inwardly directed raceway. Roller elements are located between and contacting the inner and outer raceways.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft.

The bearing assembly includes a seal assembly that provides a barrier for lubricant to be retained within the seal assembly and for contaminants to be kept out. The seal assembly includes a stator adjacent a seal section itself and a rotor affixed to a wear ring. A flinger is provided to interact with the rotor and the stator to provide an improved seal. The inter-related relationship between the seal section, stator rotor and flinger act to retain the lubricant within the seal assembly and to keep contaminants out.

DESCRIPTION OF THE PREFERRED EMBODIMENTS

Figure 1:
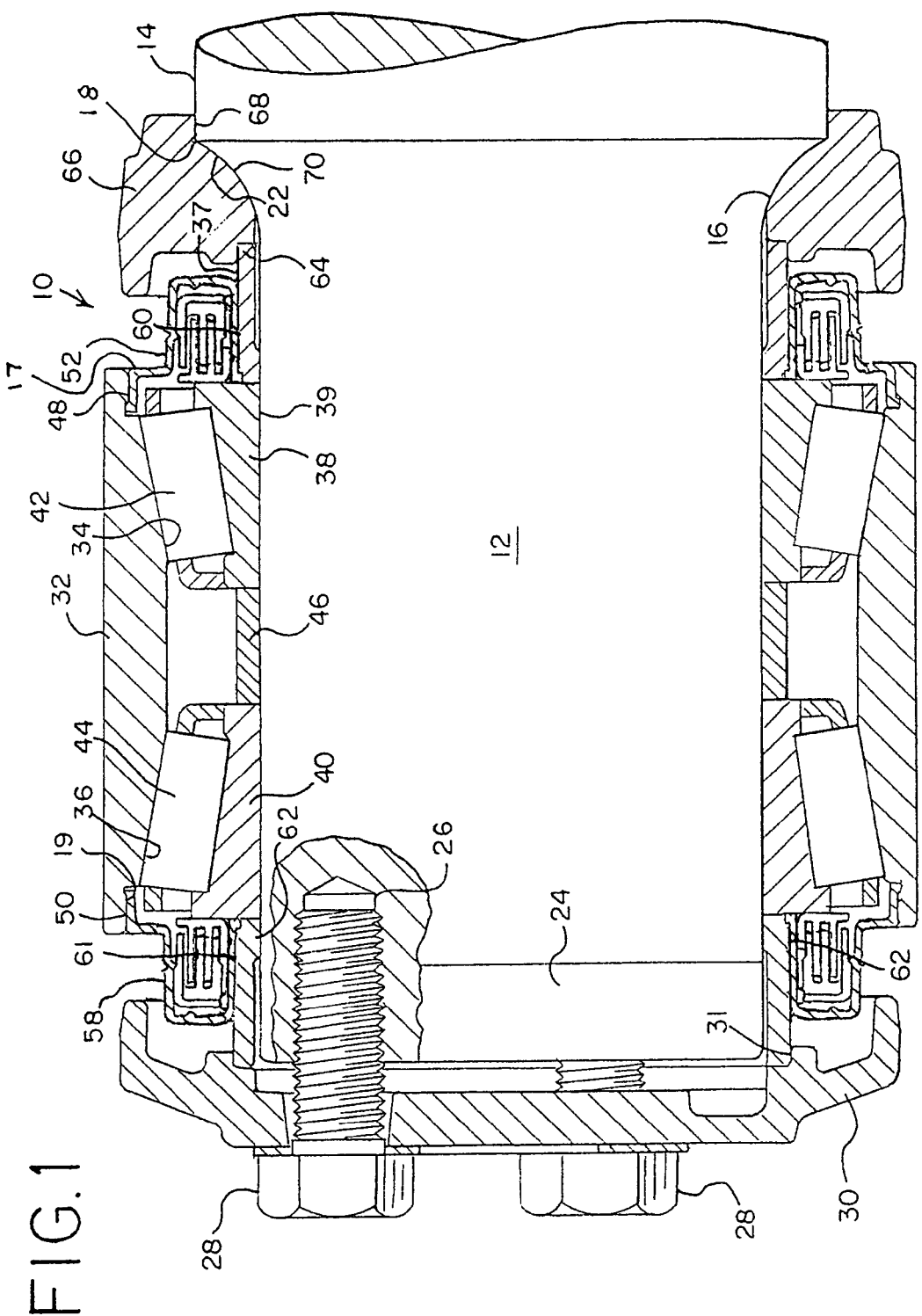
FIG. 1 is a sectional view of a shaft journal having mounted thereon a tapered roller bearing assembly in accordance with an embodiment of the present invention.

Referring now to FIG. 1 of the drawings, a bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The bearing assembly 10 is preassembled before being mounted and clamped on journal 12 by retaining cap 30 and bolts 28. The bearing assembly includes a unitary bearing cup or outer raceway 32 having a pair of inner facing raceways 34,36 formed one adjacent each end thereof which cooperate with a pair of bearing cones 38,40, having outer facing raceways respectively, to support the two rows of tapered rollers 42,44, respectively there between. A center spacer 46 is positioned between cones 38,40 to maintain the cones in accurately spaced position relative to one another allowing for proper bearing lateral clearance.

The bearing cup 32 is provided with cylindrical counterbores 17,19 at its opposite ends outward of the inner facing raceways 34,36 and a pair of seal sections 52,58 are pressed one into each of the cylindrical counterbores 17,19 in cup 32. Each seal section 52,58 may include resilient sealing elements 57 which rub upon and form a seal with surfaces 37,61 of a pair of seal wear rings 60,62 having an inwardly directed end in engagement with the outwardly directed ends of bearing cones 38,40 respectively. Seal section 58 is similar to seal section 52 and will not be described in detail. The other end of wear ring 60 is received in a cylindrical counterbore 64 in the axially outwardly directed end of an annular backing ring 66 which, in turn, has a counterbore 68 at its other end which is dimensioned to be received in interference and non-interference relation on the cylindrical shoulder 18 of shaft 14. The counterbore 64 and the outer diameter of wear ring 60 are also dimensioned to provide an interference fit so that wear ring 60 is pressed into the backing ring 66 which is accurately machined to provide a contoured inner surface 70 complementary to and engaging the contour of fillet 22 when the bearing is mounted on the shaft. The outwardly directed end of wear ring 62 bears against a counterbore 31 in a retaining cap 30.

Figure 2:
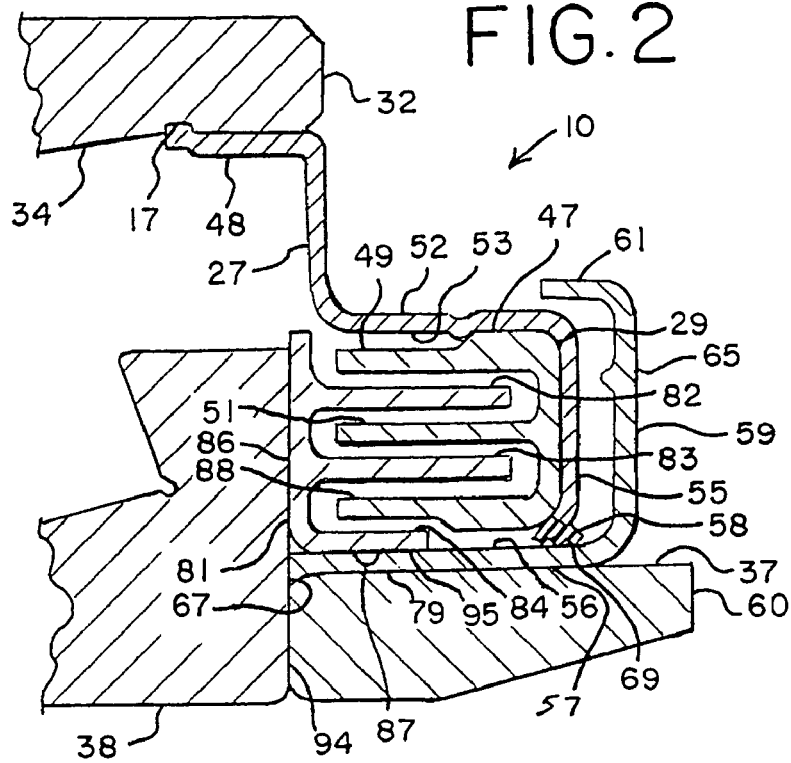
FIG. 2 is a detailed partial view in cross section of a tapered roller bearing seal assembly in accordance with a first embodiment of the present invention.

Referring now to FIG. 2, a detailed view of seal assembly portion of bearing assembly 10 is provided. Seal section 52 is seen to comprise a generally cylindrical piece, having a larger diameter first end section 48 pressed or fit into a complementary counterbore 17 in a cup 32. Seal section 52 includes an intermediate section 27 normal to first end section 48 and a main intermediate cylindrical section 53 that extends parallel to end section 48, wherein main intermediate cylindrical section 53 has a smaller diameter than end section 48.

Second end section 55 of seal section 52 extends from main intermediate section 53 at a normal angle thereto. Resilient sealing element 58 is fitted onto second end section 55. Resilient sealing element 58 is comprised of a rubber or elastomer compound, such as nitrile rubber compound. Resilient sealing element 58 includes a main section that includes an opening to receive second end 55 of seal section 52. Resilient sealing element 58 also includes base ribs 69.

Stator 47 is generally cylindrical piece, having a base section 29 and a radially outer section 49. An outer surface of outer section 49 is affixed by welding, gluing, dimpling, interference fit, or other appropriate method to an inner surface of main cylindrical section 53 of seal assembly 52. Stator 47 also includes intermediate section 51 that extends from base section 29 parallel to outer section 49. Radially inner section 88 of stator 47 extends at a normal angle from base section 29. Stator 47 is usually a unitary structure comprised of a structural plastic or steel.

Rotor 81 is seen to be a generally cylindrical structure comprised of a base section 86 and a radially outer section 82 extending therefrom and generally normal thereto. Radially intermediate section 83 extends from base section 86 and is generally normal thereto. Radially inner section 84 of rotor 81 extends from base section 86 and is generally normal thereto. Radially inner section 84 of rotor 81 has a radially inner surface 95 which is fitted against radially outer surface 56 of flinger section 65. Rotor 81 is usually a unitary structure comprised of a structural plastic or steel.

Flinger section 65 comprises a generally cylindrical structure having a base section 57, an intermediate section 59 extending from and normal to base section 57, and end section 61 extending from and normal to intermediate section 59. Flinger section 65 is usually a unitary structure comprised of a structural plastic or steel.

Flinger section 65 base section 57 is seen to have an end 67 that extends to or nearly to inner sidewall 94 of cone 38. Radially inner section 84 of rotor 81 is seen to abut outer surface 56 of flinger section 65. Radially inner section 84 of rotor 81 is also seen to include a protruding snap device 87 that is received in a complementary opening on outer surface 56 of flinger section 65. It can be seen that generally cylindrical flinger section 65 can be snap fit assembled into bearing assembly 10. Inner surface 79 of flinger section 65 is seen to abut outer surface 37 of wear ring 60.

Figure 3:
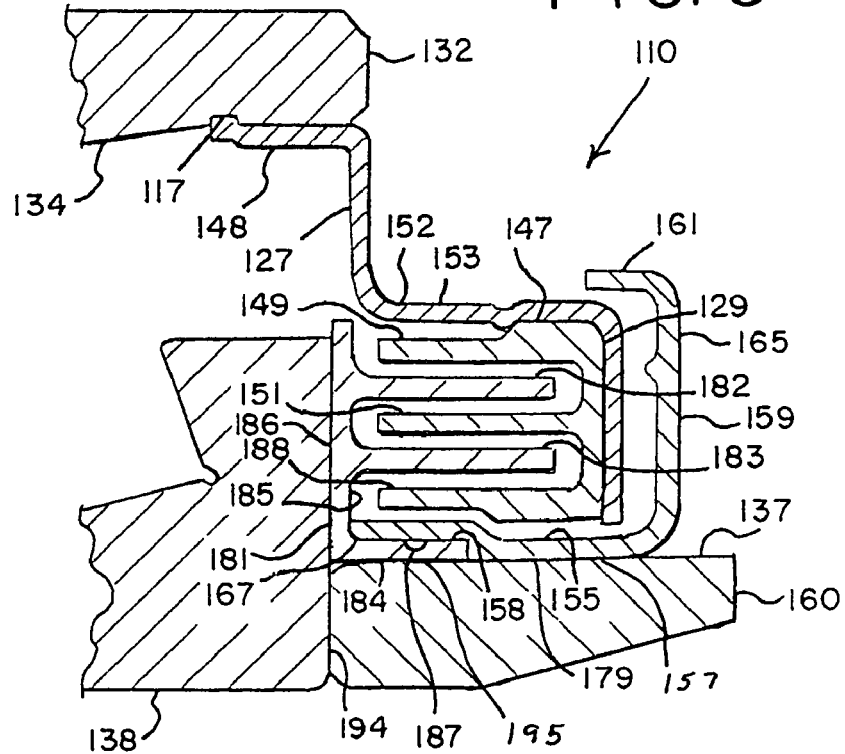
FIG. 3 is a detailed view in partial cross section of a tapered roller bearing assembly in accordance with a second embodiment of a present invention.

Referring now to FIG. 3, a second embodiment of the roller bearing seal assembly of the present invention is shown generally at 110.

Seal section 152 is seen to comprise a generally circular piece, having a larger diameter first end section 148 pressed or fit into a complementary counterbore 117 in a cup 132. Seal section 152 includes an intermediate section at normal to first end section 148 an a main intermediate cylindrical section 153 that extends parallel to end section 148, wherein main intermediate cylindrical section 153 has a smaller diameter than end section 148. Second end section 155 of seal section 152 extends from main intermediate section 153 at a normal angle thereto.

Stator 147 is generally cylindrical piece, having a base section 129 having a radially outer section 149. The outer surface of outer section 149 is affixed by welding, gluing, dimpling, interference fit, or other appropriate method to an inner surface of main cylindrical section 153 of seal section 152. Stator 147 also includes intermediate section 151 that extends from base section 129 parallel to outer section 149. Radially inner section 188 extends at a normal angle from base section 129. Stator 147 is usually a unitary structure comprised of a structural plastic or steel.

Rotor 181 is seen to be a generally cylindrical structure comprised of a base section 186 and a radially outer section 182 extending therefrom and generally normal thereto. Radially intermediate section 183 extends from base section 186 and is generally normal thereto. Inner section 184 of rotor 181 extends from base section 186 and is generally normal thereto. Inner section 184 of rotor 181 has an outer surface 195 which is fitted against radially outer surface 137 of wear ring 160. Rotor 181 is usually a unitary structure comprised of a structural plastic or steel.

Flinger section 165 comprises a generally cylindrical structure having a base section 157, an intermediate section 159 extending from and normal to base section 157, and end section 161 extending from and normal to intermediate section 159. Flinger section 165 is usually a unitary structure comprised of a structural plastic or steel.

Flinger section 165 base section 155 is seen to have an end 167 that extends to or nearly to inner sidewall 185 of rotor 181. Radially inner section 184 of rotor 181 is seen to abut outer surface 155 of flinger section 165. End 167 of flinger section 165 seen to include a protruding snap device 187 that is received in a complementary opening on inner surface 158 of radially inner section 184 of rotor 181. It can be seen that generally cylindrical flinger section 165 can be snap fit assembled into bearing assembly 110.

Figure 4:
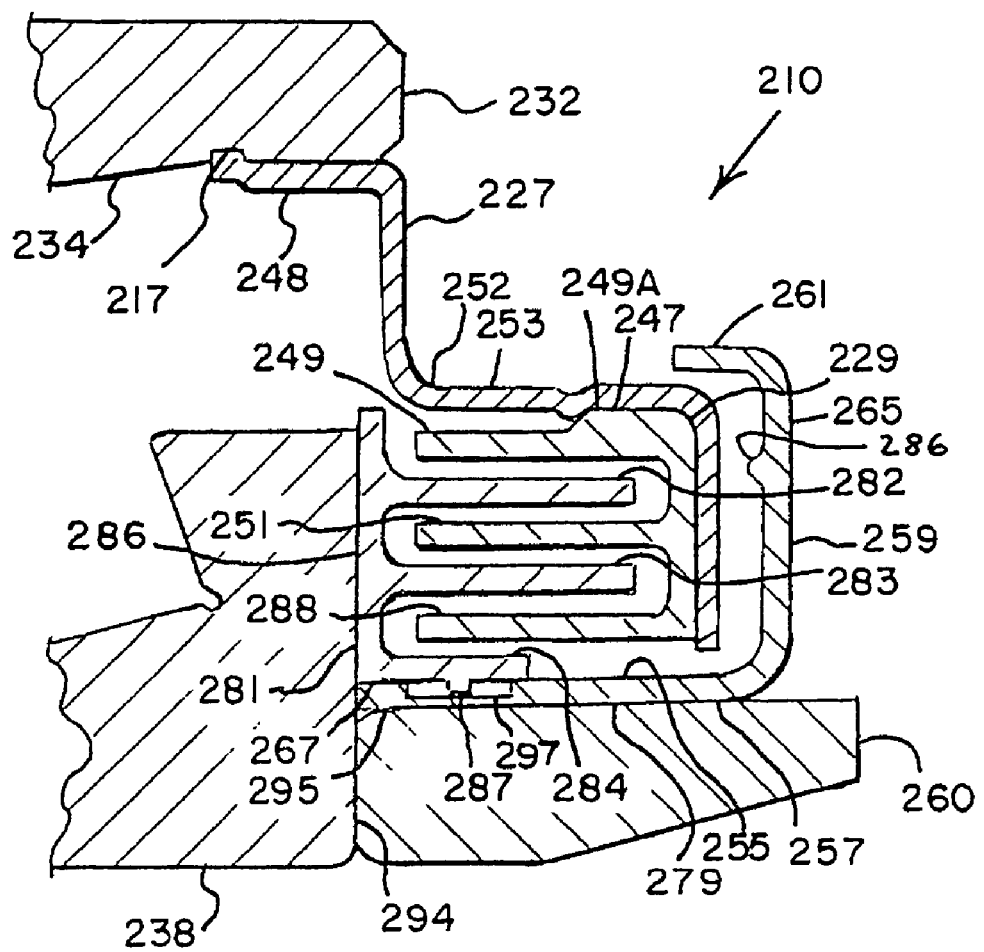
FIG. 4 is a detailed view in partial cross section of a tapered roller bearing assembly in accordance with a third embodiment of the present invention.

Referring now to FIG. 4, a third embodiment of the roller bearing seal assembly of the present invention is shown generally at 210.

Seal section 252 is seen to comprise a generally circular piece, having a larger diameter first end section 248 pressed or fit into a complementary counterbore 217 in a cup 232. Seal section 252 includes an intermediate section 227 normal to first end section 248, and a main intermediate cylindrical section 253 that extends parallel to end section 248, wherein main intermediate cylindrical section 253 has a smaller diameter than end section 248. Second end section 255 of seal section 252 extends from main intermediate section 253 at a normal angle thereto.

Stator 247 is generally cylindrical piece, having a base section 229 and a radially inner section 249. An outer surface of a portion 249A of radially outer section 249 is affixed by welding, gluing, dimpling, interference fit, or other appropriate method to an inner surface of main cylindrical section 253 of seal assembly 252. Stator 247 also includes intermediate section 251 that extends from base section 229 parallel to radially outer section 249. Radially inner section 288 of stator 247 extends at a normal angle from base section 229. Stator 247 is usually a unitary structure comprised of a structural plastic or steel.

Rotor 281 is seen to be a generally cylindrical structure comprised of a base section 286 and a radially outer section 282 having extending therefrom and generally normal thereto. Radially intermediate section 283 extends from base section 286 and is generally normal thereto. Radially inner section 284 of rotor 281 extends from base section 286 and is generally normal thereto. Radially inner section 284 of rotor 281 has a radially inner surface 295 which is fitted against radially outer surface 255 of flinger section 265.

Flinger section 265 comprises a generally cylindrical structure having a base section 257, an intermediate section 259 extending from and normal to base section 257, and end section 261 extending from and normal to intermediate section 259. Flinger section 265 is usually a unitary structure comprised of a structural plastic or steel.

Flinger section 265 base section 255 is seen to have an end 267 that extends to or nearly to inner sidewall 294 of cone 238. Radially inner section 284 of rotor 281 is seen to abut outer surface 255 of flinger section 265. Radially inner section 284 of rotor 281 is also seen to include a protruding snap device 287 that is received in a complementary elongated opening 297 in outer surface 255 of flinger section 265. It can be seen that generally cylindrical flinger section 265 can be snap fit assembled into bearing assembly 210. Inner surface 279 of flinger section 265 is seen to abut outer surface 237 of wear ring 260. Elongated opening 297 allows flinger section 265 and rotor 281 to slide relative to one another to allow for variations of lateral clearance in both new and reconditioned bearings. An annular ring 286 may be provided on flinger section 265. Annular ring 286 prevents flinger 265 from contacting seal section 252 along an area versus a line contact. It also spaces flinger 265 properly to seal section 252.

What is claimed is:

1. A roller bearing assembly comprising:
a generally cylindrical cone having a generally cylindrical, outwardly directed raceway thereon,
a generally cylindrical cup having a generally cylindrical, inwardly directed raceway thereon,
the cone having a generally flat, axially inward face,
the cup having a radially inward facing cylindrical counterbore,
a generally cylindrical wear ring adjacent and axially inward from the generally flat, axially inward face of the cone,
the wear ring having a generally cylindrical outer surface,
a seal of generally cylindrical configuration,
the seal having a first end section, an intermediate section and a second end section,
the first end section received in the radially inward facing cylindrical counterbore of the cup,
a rotor element of a generally cylindrical configuration, the rotor element comprising a base section, a radially outer section, a radially intermediate section and a radially inner section,
the radially inner section of the rotor element having an outer surface parallel to the generally cylindrical outer surface of the wear ring,
a stator element of a generally cylindrical configuration, the stator element comprising a base section, a radially outer section, a radially intermediate section, and a radially inner section,
the radially outer section of the stator element having an outer surface adjacent the radially intermediate section of the seal,
the radially outer section of the stator extending between the seal intermediate section and the radially outer section of the rotor element,
the radially intermediate section of the stator element extending between the radially outer section of the rotor element and the radially intermediate section of the rotor element,
at least a portion of the radially inner section of the stator element extending between the radially intermediate section of the rotor element and the radially inner section of the rotor element,
and a flinger element of a generally cylindrical configuration having a base section extending between the generally cylindrical surface of the wear ring and the radially inner section of the rotor element.

2. The roller bearing assembly of claim 1 further comprising
a resilient sealing element affixed to the second end section of the seal, the flinger element includes a side section extending from the base section and the base section has an inner surface,
the resilient sealing element contacting the inner surface of the flinger element.

3. The roller bearing assembly of claim 1
wherein the flinger element includes a side section extending from the base section and the base section has radially outer surface,
and including a resilient sealing element affixed to the second end section of the seal,
the resilient sealing element contacting a radially outer surface of the base of the flinger element and an outer surface of the stator.

4. The roller bearing assembly of claim 1
wherein the flinger element includes a side section that extends normal to the base section, and the base section has an inner surface, and the flinger element includes an end section that extends normal to the side section,
and a resilient sealing element affixed to the second end section of the seal,
the resilient sealing element contacting a radially outer surface of the base of the flinger element.

5. The roller bearing assembly of claim 1
wherein the flinger element includes a side section that extends normal to the base section, and the base section has an inner surface, and the flinger element includes an end section that extends normal to the side section,
and a resilient sealing element affixed to the second end section of the seal,
the resilient sealing element contacting a radially outer surface of the base of the flinger element and an outer surface of the stator.

6. The roller bearing assembly of claim 1
wherein the seal first end section is fit against the radially inward facing cylindrical counterbore of the cup,
the seal intermediate section is comprised of a first intermediate section extending generally normal to the first end section, and a second intermediate section that extends generally normal to the first intermediate section and generally parallel to the generally cylindrical outer surface of the wear ring,
and the seal second end section extending generally normal to the second intermediate section and generally normal to the generally cylindrical outer surface of the wear ring.

7. The roller bearing assembly of claim 1
wherein the rotor element base section includes an outer surface that abuts the generally flat, axially inward face of the cone,
and the radially outer section of the rotor, the radially intermediate section of the rotor each extend from and are generally normal to the base section of the rotor,
and the radially outer section of the rotor is adjacent to and radially spaced from the radially intermediate section of the rotor,
and the radially intermediate section of the rotor is adjacent to and radially spaced from the radially inner section of the rotor.

8. The roller bearing assembly of claim
wherein the stator element base section includes an outer surface that abuts an outer surface of the second end section of the end,
and the radially outer section of the stator, the radially intermediate section of the stator and the radially inner section of the stator each extend from and are generally normal to the base section of the stator, and the radially outer section of the stator is adjacent to and radially spaced from the radially intermediate section of the stator, and the radially intermediate section of the stator is adjacent to and radially spaced from the radially inner section of the stator.

9. The roller bearing assembly of claim 1
wherein the flinger element includes a side section that extends normal to the base section, and the base section has a radially outer facing surface that is adjacent a radially inner facing surface of the radially inner section of the rotor, and wherein retention assembly comprising a protrusion and a receiving structure is present on the radially outer facing surface of the base section of the flinger element and the radially inner facing surface of the radially inner section of the rotor.

10. A roller bearing assembly comprising:
a generally cylindrical cone having a generally cylindrical, outwardly directed raceway thereon,
a generally cylindrical cup having a generally cylindrical, inwardly directed raceway thereon,
the cone having a generally flat, axially inward face,
the cup having a radially inward facing cylindrical counterbore,
a generally cylindrical wear ring adjacent and axially inward from the generally flat, axially inward face of the cone,
the wear ring having a generally cylindrical outer surface
the seal having a first end section, an intermediate section and a second end section, inward facing cylindrical counterbore of the cup,
a seal of a generally cylindrical configuration,
a rotor element of a generally cylindrical configuration, the rotor element comprising a base section, a radially outer section, a radially intermediate section and a radially inner section,
the radially inner section of the rotor element having an outer surface parallel to the generally cylindrical outer surface of the wear ring,
a stator element of a generally cylindrical configuration, the stator element comprising a base section, a radially outer section, a radially intermediate section and a radially inner section,
the radially outer section of the stator element having an outer surface adjacent the radially intermediate section of the seal,
at least a portion of the radially outer section of the stator extending between the seal intermediate section and the radially outer section of the rotor element,
at least a portion of the radially intermediate section of the stator element extending between the radially outer section of the rotor element and the radially intermediate section of the rotor element,
at least a portion of the radially inner section of the stator element extending between the radially intermediate section of the rotor element and the radially inner section of the rotor element,
and a flinger element of a generally cylindrical configuration having a base section a portion of which extending between the generally cylindrical outer surface of the wear ring and the radially inner section of the rotor element.

11. The roller bearing assembly of claim 10 further comprising,
a resilient sealing element affixed to the second end section of the seal, the flinger element includes a side section extending from the base section and the base section has an inner surface,
the resilient sealing element contacting the inner surface of the flinger element.

12. The roller bearing assembly of claim 10
wherein the flinger element includes a side section extending from the base section and the base section has radially outer surface,
and including a resilient sealing element affixed to the second end section of the seal,
the resilient sealing element contacting a radially outer surface of the base of the flinger element and an outer surface of the stator.

13. The roller bearing assembly of claim 10
wherein the flinger element includes a side section that extends normal to the base section, and the base section has an inner surface,
and the flinger element includes an end section that extends normal to the side section,
and a resilient sealing element affixed to the second end section of the seal,
the resilient sealing element contacting a radially outer surface of the base of the flinger element.

14. The roller bearing assembly of claim 10
wherein the flinger element includes a side section that extends normal to the base section, and the base section has an inner surface, and the flinger element includes an end section that extends normal to the side section,
and a resilient sealing element affixed to the second end section of the seal,
the resilient sealing element contacting a radially outer surface of the base of the flinger element and an outer surface of the stator.

15. The roller bearing assembly of claim 10
wherein the seal first end section is fit against the radially inward facing cylindrical counterbore of the cup,
the seal intermediate section is comprised of a first intermediate section extending generally normal the first end section, and a second intermediate section that extends generally normal to the first intermediate section and generally parallel to the generally cylindrical outer surface of the wear ring,
and the seal second end sections extending generally normal to the second intermediate section and generally normal to the generally cylindrical outer surface of the wear ring.

16. The roller hearing assembly of claim 10
wherein the rotor element base section includes an outer surface that abuts the generally flat, axially inward face of the cone,
and the radially outer section of the rotor, the radially intermediate section of the rotor and the radially inner section of the rotor each extend from and are generally normal to the base section of the rotor,
and the radially outer section of the rotor is adjacent to and radially spaced from the radially intermediate section of the rotor,
and the radially intermediate section of the rotor is adjacent to and radially spaced from the radially inner section of the rotor.

17. The roller bearing assembly of claim 10
wherein the stator element base section includes an outer surface that abuts an outer surface of the second end of the seal,
and the radially outer section of the stator,
the radially intermediate section of the stator and the radially inner section of the stator each extend from and are generally normal to the base section of the stator,
and the radially outer section of the stator is adjacent to and radially spaced from the radially intermediate section of the stator,
and the radially intermediate section of the stator is adjacent to and radially spaced from the radially inner section of the stator.

18. The roller bearing assembly of claim 10
wherein the finger element includes a side section that extends normal to the base section, and the base section has a radially outer facing surface that is adjacent a radially inner facing surface of the radially inner section of the rotor,
and wherein a retention assembly comprising a protrusion and a receiving structure is present on the radially outer facing surface of the base section of the flinger element,
and the radially inner facing surface of the radially inner section of the rotor.

\* \* \* \* \*